United States Patent Office 2,952,586
Patented Sept. 13, 1960

2,952,586
PURIFICATION OF PROTEASES

Kazuo Okunuki, Kawamo, Takarazuk, Bunji Hagihara, Higashi, Amagasaki, and Tomizo Ukita, Fushimi-ku, Kyoto, Japan, assignors to Nagase & Co., Ltd., Nishi-ku, Osaka, Japan, a corporation of Japan No Drawing. Filed Nov. 25, 1958, Ser. No. 776,209

Claims priority, application Japan Feb. 23, 1955

9 Claims. (Cl. 195—66)

The present application is a continuation-in-part of our co-pending application, Ser. No. 535,739, filed September 21, 1955.

This invention relates to a method of purifying Bacillus subtilis protease and has among its objects the provision of a method of purifying the protease, or isolating the protease substantially free from various impurities naturally occurring in the cultivation, and also the provision of a method of removing various coloring matter accompanied by the protease, without any appreciable loss of the protease or its activity.

A culture of Bacillus subtilis contains, in addition to Bacillus subtilis protease, various impurities, such as high molecular organic substances, for example; polysaccharide, glucoprotein, nucleoprotein, coloring matter, etc., which are the autolytic and anagenetic products of the microorganism used, and low molecular substances, such as inorganic substances which may be a part of or derivatives of the culture medium. In some cases, such as for medical or food processing uses and for scientific studies, it is required that Bacilus subtilis protease be substantially free from impurities. In some instances, it is desired that Bacillus subtilis protease be free from coloring matter.

For the purification of Bacillus subtilis protease, a few routine procedures, such as salting out with ammonium sulfate or precipitation with an organic solvent, have so far been adopted. However, these conventional purifying methods always cause some impurities to deposit or precipitate together with Bacillus subtilis protease. It has been usual, therefore, that in order to obtain a satisfactory purification effect, the purification must be carried out under strict conditions remarkably reducing the yield of Bacillus subtilis protease. Furthermore, these methods can be carried out only with a laboratory technique and are not suitable to be carried out on an industrial scale.

There are a few reports that ion exchange resins have been used for the purification of certain enzymes. However, purification of enzymes by the use of ion exchange resin involves very delicate and intricate problems. Enzymes generally are very unstable and easily lose their activity; consequently purification thereof must be carried out with great care under special and very limited conditions. There are more than 1000 kinds of known enzymes and it is believed that there actually should be a countless number of enzymes. These enzymes are quite different from each other in their chemical, stereochemical structure. Therefore, their physical properties are also generally different from enzyme to enzyme. For example, their molecular weights range from about ten thousand (lysozyme, ribonuclease, Chytochrome C, etc.) to about a million (glutamic acid dehydrogenase, etc.) and their isoelectric points range from about pH 1 (pepsin) to about 11 (lysozyme, ribonuclease, Chytochrome C). Similarly, there are a number of ion exchange resins which also differ from each other in their chemical and physical properties and stereo-structure. In addition to this, there is another important problem due to the fact that each enzyme is stable only under limited conditions which generally differ from enzyme to enzyme. Therefore, and for various other reasons, particularly because of the fact that enzymes are high molecular substances and amphoteric electrolytes having many positively and negatively charged radicals and the fact that most of the impurities accompanying enzymes are high molecular organic substances, behaviors of enzymes to an ion exchange resin are quite different from each other enzyme and actions of ion exchange resins upon an enzyme are different from each other resin. Therefore, reaction between an enzyme and an ion exchange resin is distinguished from the usual or simple ion exchange phenomenon which takes place between ion exchange resins and single charge substances, such as inorganic ions or low molecular organic electrolytes.

Thus, it is very well known to enzymologists and to those skilled in the art that each enzyme has its own requirement for satisfactory purification with a good yield when ion exchange resins are used in the course of the purification process and that such process of purification is a separate and individual problem for each kind of material. In other words, it is common knowledge among those skilled in the art and enzymologists that a particular successful method of the purification of a particular enzyme by the use of a particular ion exchange resin under particular conditions can not always be applicable to the purification of another enzyme. For example, the method of purification of a bacterial pectinase with the use of "Amberlite IRC-50" resin as reported by P. W. Talboys (Nature, No. 4234, December 23, 1950, p. 1077) can not be used for satisfactorily purifying Bacillus subtilis protease. Furthermore, it is impossible to purify Bacillus subtilis protease by the use of any of ion exchange resins which have been employed in the purification of any other enzyme, under any of the conditions so far been reported. In fact, heretofore, there has been no successful and satisfactory purification method of Bacillus subtilis protease, not to speak of such method as to be able to be carried out on a large or industrial scale with a good yield or without an appreciable loss of activity.

We have found that impurities can be selectively removed from a crude Bacillus subtilis protease solution without an appreciable loss of the protease and its activity when an "adsorption-elution" process using certain coarse porous cation exchange resins under particular conditions according to this invention. We have also found that a Bacillus subtilis protease solution containing coloring matter can be substantially decolored without an appreciable loss of the protease and its activity when the solution is treated with certain anion exchange resin under special conditions in accordance with this invention, said coloring matter, particularly melanine-like coloring matter, being produced in the course of cultivation of Bacillus subtilis and having such a strong affinity for Bacillus subtilis protease as to be very difficult to be removed sufficiently by any conventional purification process.

The above mentioned decolorization process alone is sufficient when the only requirement is to remove the coloring matter from the protease. However, when desired, it is of course possible to combine the decolorization process with the "adsorption-solution" process before or after the latter. Thus, it is possible first to decolor a crude protease solution by the decolorization process and then to subject the decolored protease solution to the "adsorption-elution" treatment; or, alternatively, it is also possible to treat the crude solution first with the "adsorption-elution" process and then to decolor by the declorization method a colored fraction obtained in the course of the "adsorption-elution" stage. The latter order of the combination of steps is preferable.

Adsorption-elution

Any crude *Bacillus subtilis* protease solution can be treated, for example a culture fluid of *Bacillus subtilis* obtained by any known submerged cultivation, an aqueous extract from a solid bran culture by Koji process, an aqueous solution of a crude *Bacillus subtilis* protease preparation obtained by precipitation with ammonium sulfate or acetone from the above mentioned culture. It is preferable to render these crude solutions transparent by filtration, centrifugal separation or the like, prior to resin treatment.

The crude solution to be treated should be adjusted to pH 6 to 8, preferably to pH 6.5–7.0, with any suitable diluted acid or alkali aqueous solution, such as N aqueous solution of sodium hydroxide, acetic acid or hydrochloric acid. To increase adsorption of the protease and decrease adsorption of impurities with respect to a resin, it is recommended to adjust the cationic concentration of the protease solution as low as possible or less than 0.3 N as $Na^+$. The adjustment may be effected by any suitable method. Generally, in case of a solid bran culture, a mere extraction with a suitable amount of water will give a solution of a cation concentration desired; and in case of a crude *Bacillus subtilis* protease obtained by salting out or by precipitation with an organic solvent from a culture it is preferable to extract it with water or an aqueous buffer solution, for instance, of a cationic concentration of about 0.04–0.1 N to obtain a solution of a desired ionic strength. A filtrate of a culture broth obtained by submerged cultivation, when its ionic strength is high, should be diluted with water or dialyzed to decrease its cationic concentration within the range specified above.

The resins which can be employed in this "adsorption-elution" process of our invention are highly coarse porous phenolic polymer having methylen sulphonic acid as ion exchange radicals. An example of such resin commercially available is Duolite C–10. Highly coarse porous resin as used herein means a resin having such pores of a dimension or low cross linkage that enables a molecule of *Bacillus subtilis* protease (molecular weight of about 30,000) to pass through the pores.

It is very important that the condition or pH and ionic strength of the resin are kept substantially constant, the same as those of the protease solution to be treated or charged, during the operation. For this purpose, the resin should be carefully buffered. If the resin is not so conditioned the selective adsorptivity of the protease will be reduced and furthermore there will be a danger that the protease is inactivated.

Prior to the buffering of the resin it is preferable to wash the resin with a diluted alkali solution, such as NaOH, and further with a diluted acid, such as hydrochloric acid, with alternate washes with water.

The buffering of the resin may be carried out by equilibrating the resin with a buffer solution of a pH within the range 6 to 8 and at a cationic concentration below 0.3 N as $Na^+$. It is of course desirable that the pH and cationic concentration be substantially the same as those of the protease solution to be treated. The buffer solution may be any ordinary one, such as of acetate, phosphate, citrate, etc. It is also possible to use a buffer solution together with an aqueous solution of an alkali, such as NaOH to buffer the resin. The size of resin particle is not strict, although a size between 60–150 mesh is preferable.

The resin so treated or buffered is packed or transferred to a column or layer. The amount of the resin to be used is determined by the volume of the protease solution and its protease concentration, but should be sufficient to be able to adsorb substantially all the protease in the charged solution.

Before passing the protease solution through the resin, it is preferable to pass the above mentioned buffer solution through the resin layer to assure the equilibration of the resin with the buffer.

Then the crude protease solution is passed through the resin layer. The rate of flow of the solution is determined by the size of the resin particle, shape of the resin layer, concentration of the protease solution, etc., but it is important that the rate is sufficiently slow so that the solution is fully contacted with the resin for a sufficient period of time.

In the course of passing through the resin layer, all of the protease or *Bacillus subtilis* protease and some part of the coloring matter and a minor part of other impurities in the solution are adsorbed on the resin, while the remaining part of the coloring matter and other impurities are passed down through the resin.

After passing the crude protease solution through the resin column or layer, the resin is washed with water, thereby a greater part of the coloring matter and other impurities adsorbed on the resin is washed out therewith but the protease is substantially not.

It is preferable to further wash the resin with an aqueous acetone of about 20–40% to increase the washing effect. A further wash with water after the washing with acetone is preferable.

The elution of the protease from the resin may be carried out by passing through the resin a buffer solution of a pH higher than that at the adsorption stage. In order to avoid inactivation of the protease due to strong change in pH, to obtain a highly concentrated protease solution, and also to avoid the elution of coloring matter as possible, we have found that it is most satisfactory to use as the elutant a buffer solution of neutral salt or weakly basic salt (which does not inactivate the protease) having a cation concentration higher than 0.4 N (as $Na^+$), preferably 0.5–0.7 N, and a pH adjusted to about 9 to 11, preferably 10 to 11. The neutral or weakly basic salts which may be employed in this invention are, for instance, sodium, potassium or ammonium salts of acetic acid, hydrochloric acid, sulphuric acid, phosphoric acid, etc. The adjustment of pH may be effected by adding a weakly basic aqueous solution. Those which may be employed are of ammonia, sodium or potassium bicarbonate, etc. Thus, for instance, when the condition of the adsorption stage (or buffering of the resin) is 7.0 in pH and 0.1 N in cationic concentration, a buffer solution consisting of 0.2 N each of sodium chloride, disodium phosphate and ammonium hydroxide is suitable as an elutant.

When the elutant is passed through the resin layer after the washing aforementioned, there is first obtained a colorless solution or eluate containing the protease in a low concentration and substantially free from the impurities. Upon continuing the flow of the elutant, the concentration of the protease in the eluate becomes high while the solution remains colorless. This eluate fraction is most important. Upon further continuing the flow of the elutant the solution or eluate begins to be colored little by little while the protease eluted becomes gradually smaller. The elution is continued until no protein or protease appears in the eluate. In practice, it is convenient to add one drop of the eluate into 1 ml. of 0.6 N trichloroacetic acid solution from time to time to check the existence and concentration of the protein or protease. Thus, generally, a colorless solution or eluate containing about 50 to 60% of the protease in the charged solution and which is substantially free from the impurities is obtained.

The fraction of the eluate containing the protease and substantially free from impurities is separately collected and is subjected to a further treatment to isolate the pure protease. The isolation may be carried out by any known method. Thus, the protease may be precipitated with ammonium sulfate or organic solvent and dialysed and then air dried or lyophilized to give pure powder of *Bacillus subtilis* protease. The isolated protease can be crystallized from aqueous acetone.

The fraction of the eluate containing the protease together with the coloring matter may be subjected to similar treatment for isolation of the protease, but it is very difficult to remove the color completely. When colorless crystal or powder of the protease is to be isolated from this fraction, it is recommended to apply the decolorization operation by the use of anion exchange resins which will be described in detail hereinafter, prior to the isolation.

*Decolorization*

The decolorization as herein contemplated is to remove mainly coloring matter from a protease solution regardless of other impurities. Any crude *Bacillus subtilis* protease solution containing coloring matter may be treated. Thus, a culture fluid or extract obtained from any known *Bacillus subtilis* cultivation, an aqueous solution of a crude *Bacillus subtilis* protease obtained by salting out or by precipitation with an organic solvent from such culture, and a colored fraction obtained in the course of the above mentioned "adsorption-elution" process may be employed. It is preferable to render these crude solutions transparent by filtration, centrifugal separation or the like, prior to subjecting to the decolorization process.

The crude protease solution is conditioned in the manner same as that described in the "adsorption-elution" process except that the preferable pH is about 7 to 7.5 and the cation concentration should be lower than 1 N, preferably less than 0.5 N and $Na^+$.

The resins which can be employed in this decolorization process are porous phenol polymers having primary, secondary and tertiary amines as ion exchange radicals, such as those commercially known as Duolite A-2 and Duolite A-7. Before using, the resin should be equilibrated by a buffer solution having a pH of 6-8, preferably about 7 to 7.5 and a cation concentration lower than 1 N, preferably less than 0.5 N. Here also it is preferable to adjust the buffering condition to substantially same as that of the protease solution to be treated. Any buffer solution used in buffering of the resin in the before mentioned "adsorption-elution" process may be employed. The size of resin particle is not strict, although a size between 60-150 mesh is preferable. It is preferable, prior to buffering, to wash the resin with a diluted acid and with a diluted alkali solution with alternate washes with water as in the case of the "adsorption-elution" process.

The resin thus buffered is packed or transferred into a column or layer. The amount of the resin to be used is determined by the volume of the crude protease solution and its coloring matter content, etc.

Then the crude protease solution containing coloring matter is passed through the resin layer. The rate of flow of the solution is determined by the size of the resin, shape of the resin layer, content of the coloring matter in the solution, etc., but it is important that the solution is fully contacted with the resin. Generally, the rate of flow is about 30-100%, by volume, of the solution per hour based on the total volume of the resin.

In the course of passing through the resin layer, a greater part of the coloring matter is adsorbed on the resin, but only a minor part of the protease is adsorbed at most. Thus, substantially colorless protease solution is obtained without any appreciable loss of the protease. It is preferable to wash the resin layer with a buffer solution used in the buffering of the resin after passing the crude protease solution to wash out any protease remaining in the resin column.

The substantially colorless protease solution may be subjected to any known subsequent treatment, such as salting out, precipitation with an organic solvent, etc., or may be treated further with the aforementioned "adsorption-elution" process to remove other impurities, if any, and if desired.

The following are some representative examples of the "adsorption-elution" purification process according to our invention.

In these examples and throughout the specification, the unit of protease acitivity (T.U.) is defined as that liberated non protein digestion product from casein in one minute reaction at 35° C. which shows the same Folin color reaction as one mg. mole tyrosine.

*Example 1.*—Ground Duolite C-10 was converted to the Na-form by being treated twice with 2 N sodium hydroxide in an amount 5 times by volume of the resin and then was washed with water. About 2 liters of a section of 60-150 mesh of the resin was collected and then converted to the H-form by being treated twice with about 5 liters of 2 N hydrochloric acid and washed with water. The resin was further washed by passing 5 liters of phosphate buffer solution of pH 7.0 and containing 0.1 N $Na^+$, and suspended in 5 liters of the same buffer solution. The pH of the suspension was adjusted to 7.0 by adding saturated NaOH solution. The resin was transferred to a glass tube of 5 cm. in diameter and a column of 75 cm. in height was made. About 5 liters of said phosphate buffer solution were passed through the column so that the pH of the passed solution might be the same as the pH of the original buffer solution. The resin was thus ready for being used.

A commercial crude *B. subtilis* protease preparation (a salted-out substance of a culture solution) was dissolved in water or in a dilute phosphate buffer solution. 5 liters of a solution whose protease activity per ml. was about 0.07 casein-tyrosin unit (cas. T.U./min. at 35) (containing about 1% of pure protease) were prepared and pH thereof was adjusted to 7.0. The less the ammonium sulphate and other salts in the solution, the better. However, less than 1% of such salts had no remarkable influence. When this enzyme solution was passed through the above resin column (buffered to pH 7.0 with said 0.1 N buffer solution) at the rate of 1 liter/hour, all the protease was adsorbed on the column, and impure protein and a part of the coloring matter passed through.

When about 5 liters of tap water were passed through said column at the rate of 1 liter/hour, a large amount of the adsorbed melanine-like color was eluted therewith but the protease was not. Next, 2 liters of 40% acetone were made to flow and then 5 liters of tap water were passed, so that most of the adsorbed coloring matter was eluted but the protease was not. The higher the concentration of the co-existing salt, the more the coloring matter was adsorbed on the resin. As a considerable amount of salt was contained in the original enzyme solution in this case, the color was adsorbed. However, as the salt was washed out with water, the color was also eluted. In order to wash out as much of the coloring matter as possible, acetone washing was carried out as mentioned above.

When an alkaline buffer solution containing 0.2 N sodium chloride, 0.2 N disodium phosphate and 0.2 N ammonium hydroxide was passed through the washed column at the rate of 1 liter/hr., about the first 4 liters of eluted solution were colorless and did not contain protein. Upon continuing the flow, dilute protein came gradually to be mixed in and its concentration became gradually higher but the solution remained colorless. Heretofore, the pH of the eluted solution was kept at 6.5 to 7.2. About 2.5 liters of a colorless protein-containing fraction followed thereto, and then the solution began to be colored little by little. At the same time, the pH of the solution rapidly rose to about 10 from about 7, and then the color gradually became dense. However, the amount of protein thus eluted gradually became smaller. Upon the appearance of the protein, the colorless fraction containing protein was collected in one container. The fraction from the beginning of coloring until no protein appeared was collected in another container. The protein contained in the colorless solution was about 70% of all the protein in all the eluate and consisted almost entirely of only pure protease. The 30% protein contained in the remaining colored fraction was protease for the most part, but this fraction had a coloring matter concentration of about ⅓ of that in the original or charged enzyme solution.

The colorless fraction was salted-out with ammonium sulphate at 60% saturation. The salted-out product was washed with 75% acetone to remove ammonium sulphate and dissolved in 0.02 N aqueous sodium acetate solution. When acetone was added to the solution to the final concentration of about 60% and kept in cold for 1 or 2 hours, needle-shaped crystals were obtained. After these were dissolved in 0.01 N sodium acetate solution and recrystallized in the same way as above, they were dialyzed against 0.01 N sodium acetate and then lyophilized. The product thus obtained was white powder and stable at room temperature for a long time. The powder was uniform in electrophoresis and ultracentrifuge examinations. It was found by various proteolytic methods that the product has an enzyme activity 1.5 to 5 times as high as that of the same amount of crystalline trypsin.

Protease could be crystallized also from the colored fraction eluted following the colorless fraction. However, this fraction contained coloring matter having a strong affinity with the protease so that colorless protease could hardly be obtained. However, when the later mentioned "decoloring" operation was applied, perfectly colorless crystals were obtainable.

The enzyme activities and yields of the product from the respective fractions in the above experiment are shown in the following table.

| Fraction | Amount (ml.) | Enzyme activity (T.U./ml.) | Total enzyme activity (T.U.) | Coloring degree |
|---|---|---|---|---|
| Original enzyme solution | 5,000 | 0.073 | 365 | {++++ |
| Passed enzyme solution | 5,000 | 0.002 | 10 | ++ |
| First washings with water | 5,000 | 0.004 | 20 | ++++ |
| Washings with 40% acetone | 2,000 | 0.001 | 2 | ++ |
| Second washings with water | 5,000 | 0 | 0 | + |
| Eluted fraction 1 (colorless) | 4,200 | 0.003 | 13 | − |
| Eluted fraction 2 (colorless) | 2,600 | 0.080 | 208 | − |
| Eluted fraction 3 (colored) | 3,100 | 0.018 | 56 | + |
| Crystal from fraction 2 | 16 g. | 7.5 T.U./g. | 120 | − |
| Semi-purified product [1] | 15 g. | 6.0 T.U./g. | 90 | + |

[1] The semi-purified product in the above table is that obtained by dissolving the acetone precipitate from mother liquid of the crystals together with the salted-out product from the colored eluate in 0.02 N sodium acetate, dialysing and then lyophilizing.

*Example 2.*—2 kg. of solid bran culture obtained by Koji cultivation at 37° C. for 40 hours was extracted with 20 liters of water. The extract was filtered and the filtrate was adjusted to pH 7.0 by adding 1 N sodium hydroxide solution.

2 liters of Duolite C-10 were washed with sodium hydroxide, hydrochloric acid and water and then equilibrated with 0.05 N aqueous sodium phosphate buffer solution of pH 7.0, in a manner similar to Example 1.

The resin thus buffered was transferred to a glass tube to form a column of 70 cm. in height and 6 cm. in diameter. Then the *Bacillus subtilis* culture extract (20 liters) was passed through the column at a rate of about 2 liters/hour, and thereafter the column was washed twice with 5 liters of water with an intermediate washing with 3 liters of 30% acetone. Then, an elutant consisting of 0.2 N each of NaCl, $Na_2HPO_4$ and $NH_4OH$ was passed through the column at a rate of about 1 liter/hour. The eluate was collected in separate three fractions as in Example 1. The result was as shown in the following table:

| Fraction | Amount (ml.) | Total protease activity (T.U.) | Coloring degree | Relative content of other proteins |
|---|---|---|---|---|
| Charged protease solution | 20,000 | 100.000 | {+++++} | 100 |
| Passed solution | 20,000 | 2.50 | ++ | 90 |
| 1st wash with water | 5,000 | 5.00 | ++++ | 5 |
| 30% acetone wash | 3,000 | 0.20 | ++ | 0 |
| 2nd wash with water | 5,000 | 0 | − | 0 |
| Eluate Fract. 1 | 3,500 | 3.50 | − | 0 |
| Eluate Fract. 2 | 1,500 | 57.00 | − | 0 |
| Eluate Fract. 3 | 3,000 | 15.00 | + | 1 |

In the above table, "other proteins" are predominated by amylase. The second fraction of the eluate was substantially free from impurities and 4.26 g. (total unit 32) of pure *Bacillus subtilis* protease were obtained therefrom when crystallized as in Example 1. The colored fraction of the eluate may be subjected to the decolorization process according to this invention to remove the coloring matter.

*Example 3.*—*Bacillus subtilis* was grown in a liquid medium consisting of sweet potato starch 5%, soy bean extract 5%, disodium phosphite 1%, corn steep liquor 0.5%, other inorganic salts 0.1% and water, at pH 7.0 and at 37° C. for 24 hours. The culture or broth thus obtained was filtered twice by a filter press. The clear filtrate (20 liters) was diluted with 10 liters of water to reduce the cation concentration to about 0.15 N and its pH was adjusted to 6.3 by adding 1 N hydrochloric acid.

2 liters of Duolite C-10 resin were washed with diluted alkali solution, diluted acid and water as in Example 1 and then were equilibrated with 0.2 N sodium phosphate buffer of pH 6.3. The resin thus buffered was then allowed to settle to form a column of 70 cm. in height x 6 cm. in diameter.

3 liters of the *Bacillus subtilis* culture filtrate as conditioned above were passed through the resin column at a rate of about 2 liters/hour, and thereafter the column was washed twice with 5 liters of water with an intermediate washing with 5 liters of 30% acetone. Then an elutant consisting of 0.3 N sodium acetate, 0.2 N disodium phosphate and 0.3 N ammonia was passed through the column at a rate of about 1 liter/hour. The eluate was collected in three separate fractions as in Example 1. The result was as shown in the following table:

| Fraction | Amount (ml.) | Total protease activity (T.U.) | Coloring degree | Relative content of other proteins |
|---|---|---|---|---|
| Charged protease solution | 30,000 | 130.0 | {++++++} | 100 |
| Passed solution | 30,000 | 3.2 | +++++ | 85 |
| 1st wash with water | 5,000 | 6.5 | +++++ | 7 |
| 30% acetone wash | 5,000 | 0.5 | +++ | 1 |
| 2nd wash with water | 5,000 | 0 | ++ | 0 |
| Eluate Fract. 1 | 3,500 | 4.0 | − | 0 |
| Eluate Fract. 2 | 1,500 | 75.0 | − | 0 |
| Eluate Fract. 3 | 3,000 | 20.0 | + | 1.5 |

In the above table, "other proteins" are predominated by amylase. The second fraction of the eluate was substantially free from impurities and 5.3 g. (total unit 40) of pure *Bacillus subtilis* protease were obtained therefrom when crystallized as in Example 1. The colored fraction of the eluate may be further treated by the decolorization process to remove the coloring matter.

*Example 4.*—A protease solution obtained from the cultivation of a strain different from the strain used in Example 3, for instance a culture of *B. mesentericus* which now is known to be equivalent to *Bacillus subtilis* could be purified, when treated as in Example 3, with substantially same yield (30 to 35%) of pure crystals.

The following Examples 5 to 8 illustrate some representative methods of the decolorization of *Bacillus subtilis* protease by using anion exchange resins according to this invention. In these examples, total color intensity was determined by diluting (for instance 3–5 times) the solution, measuring the optical density of the diluted solution at 470 m$\mu$, and multiplying the value by the dilution multiple and the total volume (ml.).

*Example 5.*—2 kg. of solid bran culture obtained by Koji cultivation at 37° C. for 40 hours was extracted with 20 liters of water and the extract, after filtration, was adjusted to pH 7.5 by adding 1 N sodium hydroxide solution. The clear but dark brown protease solution thus obtained was 19 liters.

1 liter of Duolite A–7 resin was washed with acid alkali solution and water as in Example 6 hereinafter given and equilibrated with 0.1 N aqueous ammonium acetate solution of pH 7.5. The buffer solution may be replaced by 0.1 N acetic acid adjusted to pH 7.5 by adding ammonium hydroxide.

The buffered resin was transferred to a glass tube to form a column of 35 cm. in height and 6 cm. in diameter. Then, the clear culture extract was passed through the resin column at a rate of about 600 ml. per hour. Thereafter, the column was washed with 2 liters of the buffer solution used in the buffering of the resin. The passed solution and the washing solution were mixed together to obtain 21.5 liters of a solution which contains 97% of the protease in the charged colored solution but contains less than 1/10 of the color of the charged solution. The result is shown in the following table.

|  | Protease solution, liters | Total color intensity | Protease T.U./ml. |
|---|---|---|---|
| Before | 19 | 17.7×10³ | 4.5×10⁻³ |
| After | 21.5 | 1.27×10³ | 3.85×10⁻³ |

When the solution thus obtained was salted out with the addition of ammonium sulfate, a powdery enzyme of a very low coloring degree suitable for processing foods was obtained.

*Example 6.*—10 liters of the transparent culture filtrate of Example 3 were used. The filtrate was 0.2–0.25 N in cation concentration and 7.5–7.8 in pH, and therefore was suitable for subjecting to the decolorization as such.

1 liter of Duolite A–2 resin (60–150 mesh) was washed twice with 5 liters of 2 N aqueous sodium hydroxide solution. After further thoroughly washing with water, the resin was further washed with 10 liters of 2 N acetic acid to convert the resin to acetic acid form. Next, the resin was washed with 2 liters of 0.2 N ammonium acetate buffer solution of pH 7.5 and was suspended in 5 liters of the same buffer solution and then the suspension was adjusted to pH 7.5 by adding 30% aqueous ammonia. Then the buffered resin was transferred to a column of 35 cm. in height and 6 cm. in diameter.

Then, the clear culture filtrate was passed through the resin column at a rate of about 400 ml./hour. After passing, the column was washed with 0.5 liter of the buffer solution used in the buffering of the resin. The passed culture filtrate and the washing buffer solution were mixed together to obtain 11 liters of a solution which contains 95% of the protease but less than 10% of color of the charged colored solution. The result is shown in the following table.

|  | Protease solution, liters | Total color intensity | Protease T.U./ml. |
|---|---|---|---|
| Before | 10 | 19.80×10³ | 4.0×10⁻³ |
| After | 11 | 1.82×10³ | 3.46×10⁻³ |

The solution thus decolored was salted out by the addition of ammonium sulfate or sodium sulfate to obtain a powdery enzyme preparation of a very low coloring degree.

*Example 7.*—20 kg. of crude *Bacillus subtilis* protease which was obtained by salting out from a submerged culture were dissolved in 0.02 N sodium phosphate buffer solution to 1,000 liters (pH 7.5).

200 liters of Duolite A–2 resin were washed with acid, alkali solution and water as in Example 6 and were buffered as in Example 6 and transferred into a column of 2.44 m. in height and 70 cm. in diameter.

Then the crude protease solution was passed through the resin column at a rate of about 100 liters per hour. After passing, the column was washed with about 150 liters of the same buffer solution as that used in buffering the resin. The passed solution and the washing buffer solution were mixed together to obtain 1200 liters of a solution which contains 95% of the protease but less than 5% of the color of the charged solution. The result is shown in the following table.

|  | Protease solution, liters | Total color intensity | Protease T.U./ml. |
|---|---|---|---|
| Before | 1,000 | 4,800×10³ | 32×10⁻³ |
| After | 1,200 | 200×10³ | 25.3×10⁻³ |

The solution thus obtained was salted out by the addition of ammonium sulfate or sodium sulfate to obtain a powdery enzyme preparation of a very low coloring degree.

*Example 8.*—In this example, the eluate fraction No. 3 or colored fraction (100 liters) obtained in Example 1 was used. The colored fraction was adjusted to pH 7.5 by adding dilute acetic acid.

300 ml. of Duolite A–2 (60–150 mesh) were washed twice with 1.5 liters of 2 N aqueous sodium hydroxide solution followed by thorough wash with water. Then, the resin was further washed with 3 liters of 2 N acetic acid and with water. The resin was then suspended in 600 ml. of 0.2 sodium phosphate buffer solution, and the pH thereof was adjusted to pH 7.5 by adding 30% aqueous ammonia. The resin thus buffered was transferred to a column of 4 cm. in diameter and 24 cm. in height.

The colored eluate adjusted to pH 7.5 as mentioned above was passed through the resin column at a rate of about 300 ml./hour. After passing, the column was washed with 0.7 liter of the buffer solution used in buffering the resin. The passed solution and the wash were mixed together to obtain a substantially colorless solution (3.6 liters). The result is as shown in the following table.

|  | Protease solution, liters | Total color intensity | Protease T.U./ml. |
|---|---|---|---|
| Before | 3.1 | 0.8×10³ | 0.018×10⁻³ |
| After | 3.6 | 0.05×10³ | 0.015×10⁻³ |

When the solution thus obtained was subjected to crystallization as in Example 1, 1.52 grams of substantially colorless pure Bacillus protease were obtained.

We claim:

1. A method for purifying *Bacillus subtilis* protease which comprises passing a crude solution containing *Bacillus subtilis* protease and impurities and adjusted to a pH between 6 and 8 and to a cation (as Na$^+$) concentration below 0.3 N through a layer of a resin selected from coarse porous methylene sulphonic acid-phenol polymers, said cation exchange resin being buffered to a pH between 6 and 8 and a cation (as Na$^+$) concentration below 0.3 N and which, in said buffered condition, substantially adsorbs the protease and at most a minor part of the impurities, the greater part of said impurities passing down through the resin, then passing as an elutant a buffer solution adjusted to a pH between 9 and 11 and to a cation concentration higher than 0.4 N, whereby the protease is eluted from the resin with said elutant while such impurities as are adsorbed on the resin remain adsorbed thereon, and collecting the said substantially pure fraction of the eluate.

2. A method as claimed in claim 1, wherein the resin is washed with water after passing the protease solution but prior to passing the elutant to remove the coloring matter and other impurities adsorbed on the resin.

3. A method as claimed in claim 1, wherein after passing the protease solution but prior to passing the elutant, the resin is washed at least twice with water with an intermediate washing with diluted acetone to remove the coloring matter and other impurities adsorbed on the resin.

4. A method as claimed in claim 1, wherein the protease solution to be charged is adjusted to a pH between 6.5 and 7.0, and the elutant is adjusted to a pH between 10 and 11 and to a cation concentration between 0.5 and 0.7 N.

5. A method as claimed in claim 1, wherein the pH and the cation concentration of the protease solution to be charged are substantially the same as those in the buffering of the resin.

6. A method as claimed in claim 1, wherein a fraction of the eluate containing the protease and substantially free from the impurities is subjected to a crystallization process which is known per se to crystallize the pure protease.

7. A method for purifying Bacillus subtilis protease solution which comprises passing a solution containing the protease and coloring matter and adjusted to a pH between 6 and 8 and to a cation concentration below 1 N through a layer of a coarse porous phenolic anion exchange resin having primary amino, secondary amino and tertiary amino groups as anion exchange radicals, said anion exchange resin being buffered to a pH between 6 and 8 and to a cation concentration below 1 N and which, in said buffered condition, adsorbs the coloring matter but hardly adsorbs the protease, thereby adsorbing substantially all of the coloring matter on said resin while passing down the protease containing solution in substantially colorless state without losing the activity of the protease.

8. A method as claimed in claim 7, wherein the crude protease solution to be charged is adjusted to a pH between 7 and 7.5 and a cation concentration less than 0.5 N, and the resin is buffered to the condition substantially equal to that of the protease solution in pH and cation concentration.

9. A method as claimed in claim 7, wherein the protease solution to be passed is a fraction of the eluate obtained in the process of claim 1 which contains the protease but also the coloring matter and which comes out after the substantially pure fraction of the eluate.

References Cited in the file of this patent

Gilbert et al.: "Biochemical Journal," vol. 47 (1950), pp. 502–506.

P. W. Talboys: "Nature," vol. 166 (1950), p. 1077.

"Advances in Enzymology," vol. 14, 1953, pp. 338 and 339.

"Analytical Chemistry," vol. 26, January 1954, page 106.